July 11, 1950  A. N. WALSTROM  2,514,917
POWER-DRIVEN MOWER
Filed July 2, 1945  4 Sheets-Sheet 1
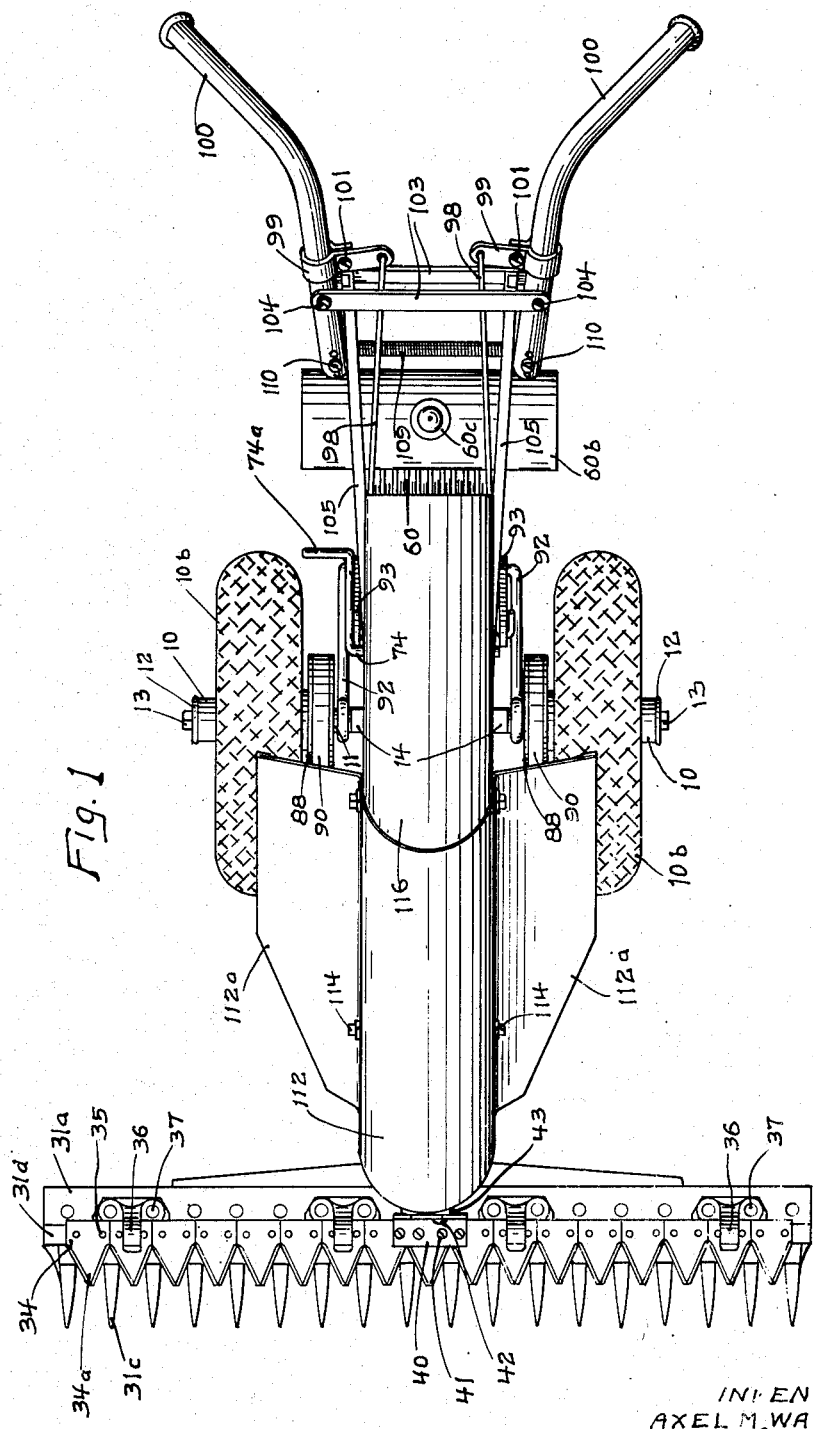
INVENTOR
AXEL M. WALSTROM
BY *Chas. C. Keyf*
ATTORNEY

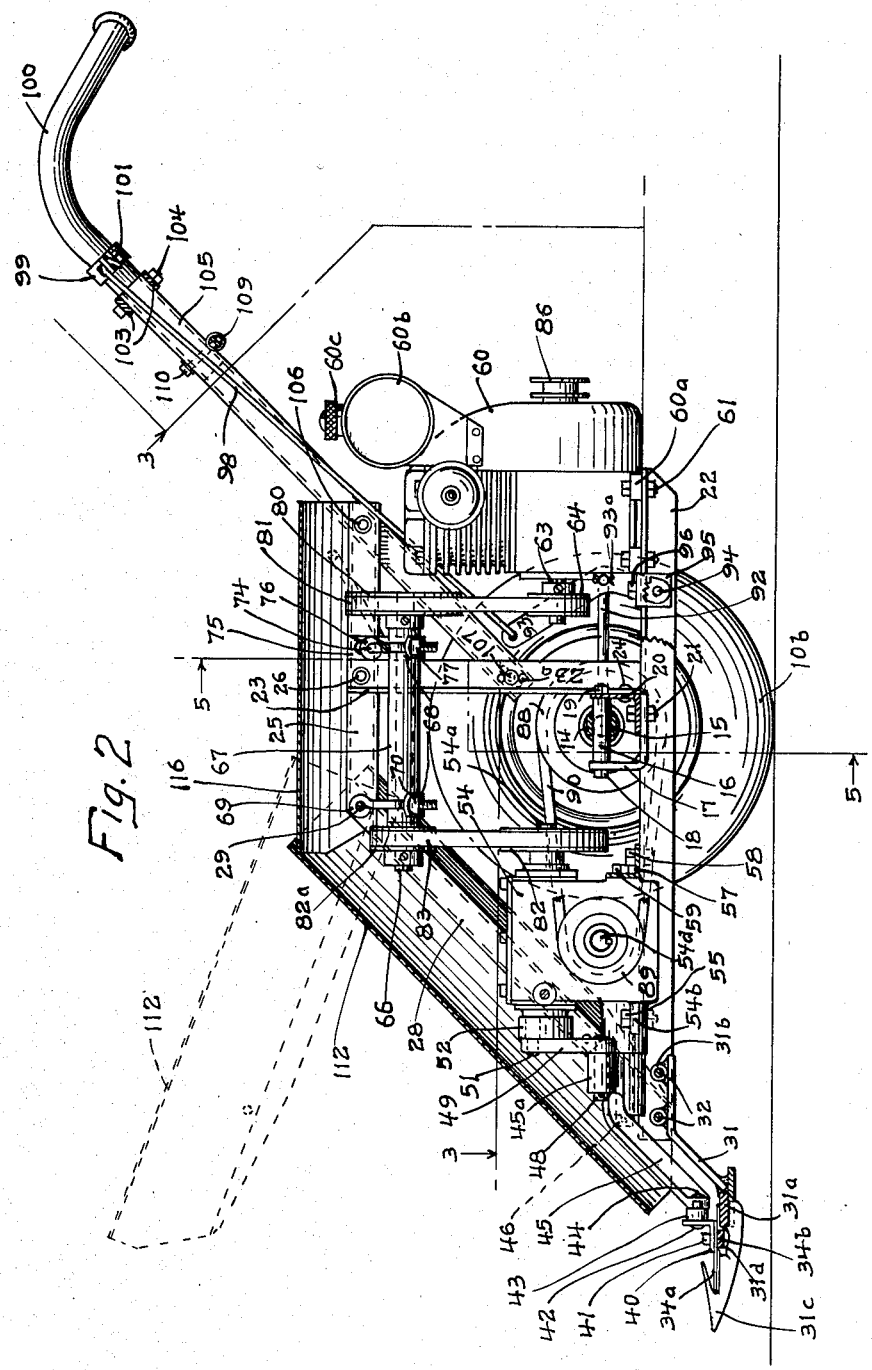

July 11, 1950        A. N. WALSTROM        2,514,917
POWER-DRIVEN MOWER
Filed July 2, 1945        4 Sheets-Sheet 3
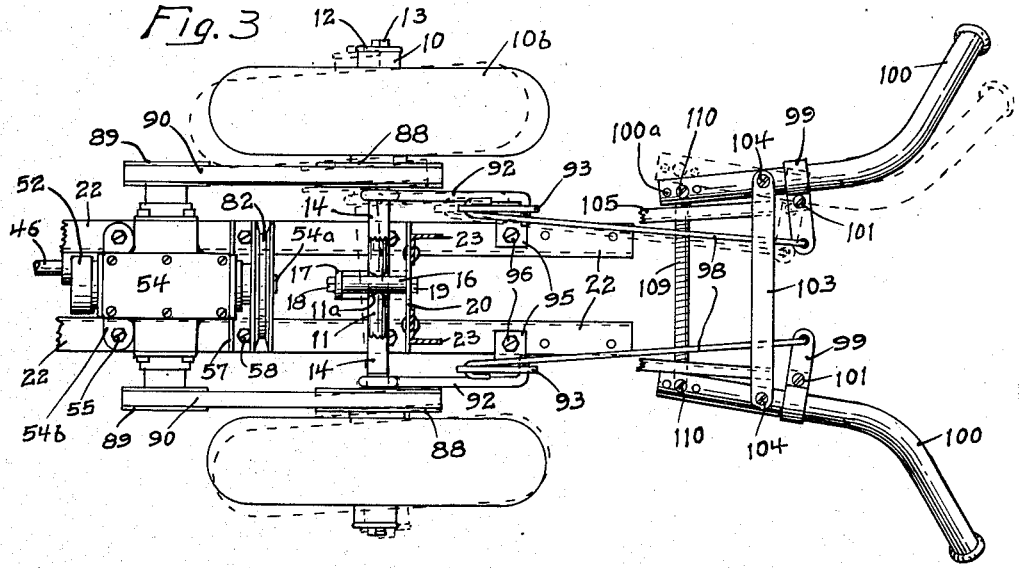
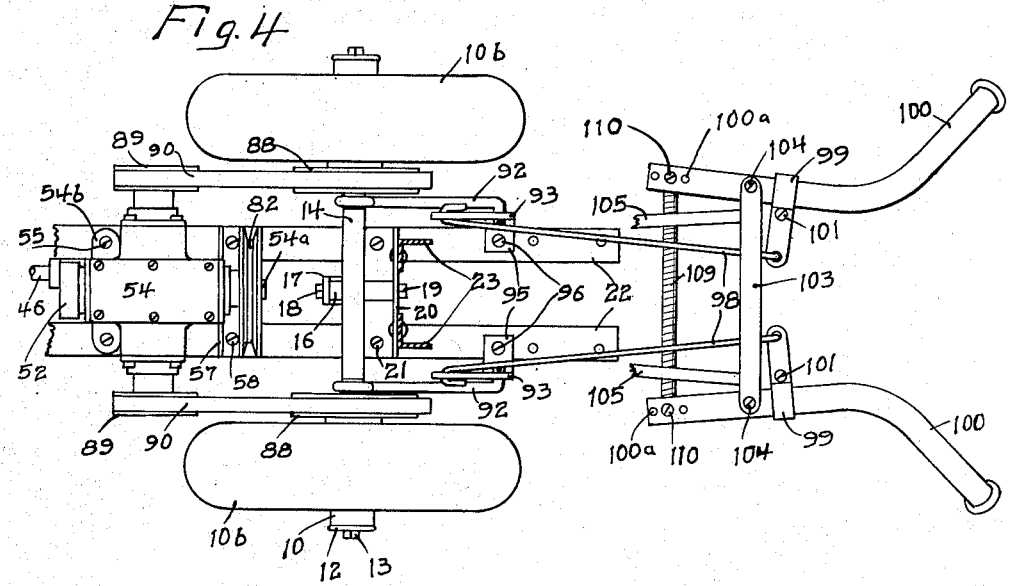
INVENTOR
AXEL M. WALSTROM
BY
ATTORNEY July 11, 1950 A. N. WALSTROM 2,514,917
POWER-DRIVEN MOWER
Filed July 2, 1945 4 Sheets-Sheet 4
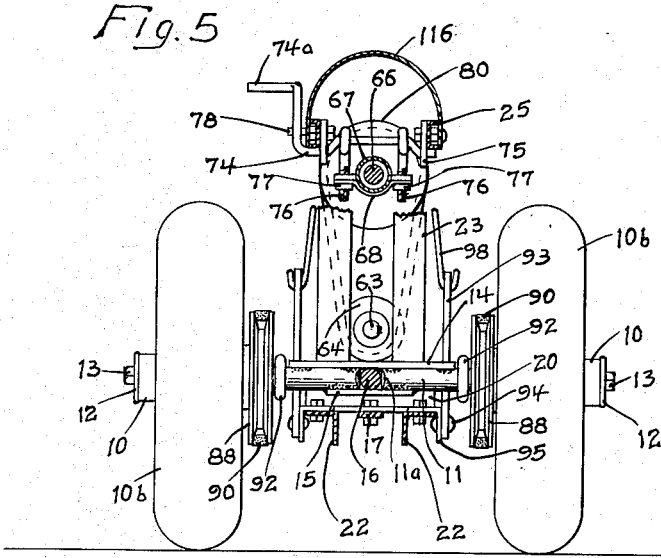
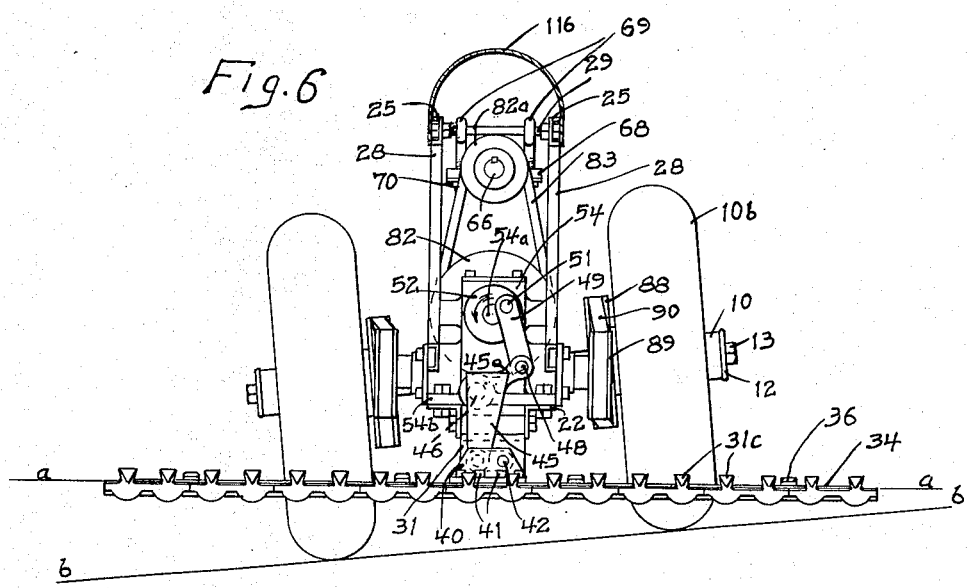
INVENTOR
AXEL M. WALSTROM
BY
ATTORNEY Patented July 11, 1950

2,514,917

UNITED STATES PATENT OFFICE 2,514,917

POWER-DRIVEN MOWER

Axel M. Walstrom, Minneapolis, Minn.

Application July 2, 1945, Serial No. 602,738

14 Claims. (Cl. 56—26.5)

This invention relates to a mower and while the invention is capable of doing mowing of various kinds, it more particularly is designed as a power cutter for cutting and trimming grass and weeds along fences, highways, etc. and on farms, lawns, golf courses and in cemeteries. It is very desirable to have a power driven mower of this type where a considerable area is to be kept in good condition, as on large estates and in various institutions and other establishments.

It is an object of this invention to provide a simple, efficient and flexible power driven mower and one which can be very easily and quickly controlled by the operator.

It is another object of the invention to provide a mowing device comprising a pair of supporting wheels, an axle on which said wheels are mounted, a comparatively narrow frame carried on said axle and oscillatable about the axis thereof, a cutter at the front of said frame extending transversely thereof, handles at the rear of said frame adapted to be grasped by the operator for manipulating said device, a motor on said frame at the rear of said axle for driving said cutter and wheels, and a speed reduction unit and cutter driving means at the front of said axle whereby said frame is substantially balanced.

It is another object of the invention to provide a mowing device comprising a pair of supporting wheels, a member on which said wheels are mounted, a frame mounted on said member, a cutter at the front of said frame extending transversely thereof, a motor on said frame, means for driving said cutter from said motor, means for driving each of said wheels from said motor and means for rendering more or less inoperative one of the driving means to said wheels whereby the other of said wheels will act to cause said device to turn.

It is still another object of the invention to provide a mowing device comprising a pair of supporting wheels, a frame supported by said wheels, a cutter at the front of said frame extending transversely thereof, a motor on said frame, means extending to each of said wheels for driving the same from said motor, a pair of handles at the rear of said frame adapted to be grasped by the operator and means actuated by movement of either of said handles for rendering more or less inoperative one of said means whereby the wheel driven by the other of said means will act to cause said device to turn.

It is further an object of the invention to provide a mowing device comprising a pair of supporting wheels, an axle on which said wheels are mounted, a narrow frame carried on said axle and constructed and arranged for universal movement about an intermediate point on said axle, a cutter at the front of said frame extending transversely thereof, a motor on said frame, means for driving said cutter and said wheels from said motor and means disposed at the rear of said frame adapted to be held by the operator for controlling said device.

It is more specifically an object of the invention to provide a mowing device having a pair of supporting wheels, a frame supported by said wheels, a cutter disposed at the front of said frame extending transversely thereof, a motor on said frame, means extending to each of said wheels for driving the same from said motor including a belt and means preferably in the form of movable handles, actuated by the operator for slackening either of said belts, whereby the wheel driven by the other of said belts will act to cause said device to turn or whereby both belts may be slackened to stop or reduce the driving effect thereof so that said driver may be pulled rearwardly by the operator.

It is still further an object of the invention to provide such a device as set forth in the preceding paragraph, said device having a pair of movable handles, preferably arranged for opposite movement, disposed at the rear of said frame, said last mentioned means being connected to and operated by movement of said handles.

It is also an object of this invention to provide a mower comprising a pair of supporting wheels, a frame carried by said wheels, a cutter at the front of said frame extending transversely thereof, means for driving said cutter, means at the rear of said frame adapted to be held by the operator for manipulating said device, said frame being oscillatable transversely relatively to said wheels, whereby the operator can hold said cutter parallel to the ground while said wheels may respectively rise or fall in accordance with the terrain and so that full traction will be had by said wheels at all times.

It is again an object of this invention to provide a mower comprising a pair of wheels, a frame supported on said wheels, a cutter carried at the front of said frame and extending transversely thereof, a motor carried on said frame, means for driving said cutter from said motor including a belt and means adapted to be actuated by the operator for slackening said belt to discontinue the driving of said cutter, whereby said belt and means has the effect of a clutch.

It is still more specifically an object of the invention to provide a mowing device comprising a pair of supporting wheels, a frame carried by said wheels, a cutter at the front of said frame extending transversely thereof, a motor on said frame at the rear of the axis of said wheels, a counter-shaft carried on said frame extending longitudinally thereof, a belt connecting the rear end of said counted-shaft and said motor, a speed reduction unit on said frame in front of the axis of said wheels, means connecting said counter-shaft and said speed reduction unit and means connecting said speed reduction unit and said cutter for driving the latter.

It is also an object of the invention to provide such a device as set forth in the preceding paragraph together with means preferably in the form of a belt connecting said speed reduction unit and each of said wheels for driving the latter.

These and other objects and advantages of the invention will be fully set forth in the following description made in connection with the accompanying drawings in which like reference characters refer to similar parts throughout the several views and in which:

Fig. 1 is a plan view of the device;

Fig. 2 is a view in side elevation of said device;

Fig. 3 is a horizontal section taken substantially on line 3—3 of Fig. 2, some parts being omitted and other parts being shown in different positions in dotted lines;

Fig. 4 is a view similar to Fig. 3, the central part of the section being taken at a slightly higher plane;

Fig. 5 is a vertical section taken substantially on line 5—5 of Fig. 2, as indicated by the arrows; and Fig. 6 is a view in front elevation of the device.

Referring to the drawings, a mowing device is shown having a pair of supporting wheels 10. While these wheels could be variously made, they are shown as comprising rims 10a equipped with pneumatic tires 10b. Said wheels are mounted upon an axle 11 and will rotate upon suitable bearings, such as ball bearings (not shown). Hub caps 12 are shown at the outer side of each wheel secured by headed screws 13. The axle 11 is shown as being cylindrical or in the form of a round rod which is cut away at its central portion. The ends of said axle adjacent said central portion are beveled as shown at 11a in Figs. 3 and 5, the bevel extending from each side of the shaft to a central plane so that there is a vertical edge at the end of the shaft disposed substantially centrally thereof. The two portions of axle 11 are connected by members 14 and 15 which extend respectively along the top and bottom of said axle and are welded thereto. While portions 14 and 15 could be variously formed, they are illustrated as in the form of bars rectangular in cross section, member 15 being somewhat shorter than member 14. A shaft 16, of comparatively short length, extends between the beveled ends 11a of axle 11 substantially in contact therewith and between members 14 and 15. Shaft 16 is supported at its front end in the vertical portion of an angle bracket 17. A headed screw 18 extends through bracket 17 into shaft 16. At its rear end shaft 16 is connected by a headed screw 19 threaded thereinto and through the vertical flange of an angle member 20 to which bracket 17 is secured by a headed and nutted bolt 21. Angle member 20 forms part of the frame of the device, which frame also comprises longitudinally extending members 22 illustrated as in the form of angle bars having horizontal flanges extending away from each other and having vertical flanges extending downwardly. Members 22 are substantially parallel and with the machine shown in the position shown in Fig. 2 extend substantially horizontally. Said frame also comprises vertically extending members 23 also illustrated in the form of angle bars, the same having vertical flanges extending toward each other and secured at their lower ends to angle member 20 in any suitable manner as by the rivets 24. Members 23 have rearwardly extending vertical flanges and these are connected at their adjacent upper ends to horizontally extending members 25 by headed and nutted bolts 26. Members 25 are shown as extending longitudinally of the device in substantially parallel relation and are illustrated as in the form of channels having their flanges facing away from each other. Other frame members 28 are connected respectively to the front ends of members 25, as by welding, and extend downwardly and forwardly towards members 22.

A bracket 31 is secured between the members 22 adjacent the front ends thereof by headed bolts 32. Bracket 31 has spaced bosses 31b which are bored to receive the bolts 32. Bracket 31 extends downwardly at the front of the machine and is welded to a cross bar 31a which extends transversely substantially equal distances from the longitudinal center of the machine and the frame thereof. Cross bar 31a carries forwardly projecting guards 31c in the form of pointed teeth which are provided with a guide channel 31d in which is guided for reciprocation a sickle 34. Sickle 34 has forwardly projecting teeth 34a substantially triangular in form, the same having rear rectangular portions secured by bolts or rivets 35 to a lower bar 34b forming part of the sickle. Upper guide members 36 are disposed in spaced relation along cross bar 31a and secured thereto by bolts 37, the same having forwardly extending portions extending over and substantially in contact with sickle 34. Members 36 are shown as four in number. A member 40, illustrated as in the form of an angle, has a horizontal forwardly projecting flange secured to sickle 34 by the spaced screws 41. Member 40 has a vertically extending flange to which is connected by a pivot bolt or pin 42 one end of a short link 43, the other end of which is connected by a pivot bolt or pin 44 to the lower end of a member or bar 45 which extends upwardly and rearwardly and has a hub secured to a shaft 46. Said hub of member 45 has a radially projecting arm 45a, the outer end of which is pivotally connected by a headed pin 48 to the lower end of a link 49. Pin 48 is held in place in any suitable manner as by a pin or cotter 50 extending therethrough. Link 49 is pivotally connected at its upper end to a crank pin 51 journaled in a crank disc 52. Crank disc 52 is connected to a rotating shaft 54a projecting from a speed reduction unit 54. Speed reduction unit 54 comprises a casing as shown, having a forwardly projecting flange 54b supported upon and secured to the frame members 22, said flange being secured by headed and nutted bolts 55. A member 57, illustrated as an angle bar, extends between and is supported upon members 22, being secured thereto by headed and nutted bolts 58. Headed screws 59 extend through the vertical flanges of member 57 and into the casing of speed reduction unit 54, thus further securing said unit.

A motor 60 is mounted on the frame of the machine, the same being shown as having a casing with laterally extending flanges 60a at its bottom, which flanges rest upon frame members 22. Flanges 60a are connected to members 22 by the headed and nutted bolts 61. While motor 60 might be of various types, in the embodiment of the invention illustrated it is shown as an internal combustion motor. Said motor is illustrated as having a gas tank 60b equipped with a filling spout and cap 60c. A motor shaft 63 projects from the front of motor 60 and has secured thereto a pulley 64. A counter-shaft 66 is provided, the same extending longitudinally of said frame and being disposed some distance above axle 11. Shaft 66 is journaled in a sleeve bearing 67 in turn supported upon spaced cradle brackets 68, said brackets as shown in Fig. 5 having concave portions in which bearing 67 is disposed. Eye bolts 69 are carried on bolt 29, which bolt passes through the eyes thereof and said eye bolts extend through holes in the ends of one bracket 68, the latter being supported upon nuts 70 threaded on eyes bolts 69. A crank member 74 extends through apertures in platelike brackets 75 secured to the inner side of each channel 25, the crank portion of member 74 being disposed between brackets 75 and passing through the eyes of a pair of spaced eye bolts 76 which pass through apertures in the ends of the rear bracket 68, said brackets resting upon nuts 77 threaded on bolts 76. Crank 74 has a handle portion at the outer side of one channel member 25 and is equipped with a horizontal handle portion 74a. A pin 78 projects from channel 25 and is arranged to be engaged by crank 74 when in the position shown in Fig. 5. Counter-shaft 66 at its rear end has secured thereto a pulley 80 and a belt 81 runs over pulleys 64 and 80, said pulleys being shown as of the grooved type. A pulley 82 is secured to the front end of counter-shaft 66. The shaft 54a projects from the rear end of speed reduction unit 54 and has a pulley 82a secured thereto. A belt 83 runs over pulleys 82 and 82a, which pulleys are also shown as of the grooved type. Motor 60 has a shaft projecting at its rear side to which is secured a grooved rope starting pulley 86.

Each wheel 10 has secured thereto at its inner side a pulley 88. Speed reduction unit 54 has a shaft 54d projecting at each side, said shaft having secured to each end thereof a pulley 89. Belts 90 extend between each pair of pulleys 89 and 88 respectively. Belts 90 as shown in Fig. 5 are illustrated as of the V-type and pulleys 88 and 89 are accordingly provided with V-shaped peripheral grooves. It may be stated that speed reduction unit 54 is of the common commercial type and comprises speed reduction gears such as a worm and worm wheel connecting shafts 54a and 54d. A further description of said unit is considered unnecessary.

A rodlike link 92 is connected to axle 11 adjacent each pulley 88. While links 92 could be variously so connected, they are shown as having their ends bent around axle 11. Links 92 extend rearwardly and have their rear ends bent inwardly substantially at right angles and extending through levers 93 respectively formed of flat bars, said ends of links 92 being secured in any suitable manner, as by cotter pins 93a. Levers 93 are pivoted adjacent their lower ends on pivot members 94 secured in small angle brackets 95 in turn secured to members 22 respectively by the screws 96. Levers 93 are bent at an angle to thus be of the bell crank type and are connected adjacent their upper ends to rod links 98 which extend rearwardly and upwardly and are secured at their upper ends in apertures formed in brackets 99 which embrace and are clamped to a pair of handles 100 respectively by headed screws 101. As shown in Figs. 1, 3 and 4, brackets 99 project inwardly from handles 100. While handles 100 could be variously formed, in the embodiment of the invention illustrated they are shown as tubular in form, the same being bent intermediate their ends so that their rear ends diverge outwardly and rearwardly. Handles 100 are pivotally connected adjacent their ends on spaced bars 103 by the headed screws 104. Bars 103 are rigidly secured in any suitable manner, as by welding, to the upper ends of a pair of members 105, illustrated as in the form of channel bars disposed with their flanges projecting outwardly or away from each other. Members 105 are also connected to frame members 25 by bolts 106. Members 105 are also connected to the vertically extending frame members 23 by headed and nutted bolts 107 respectively, which bolts may be disposed in any one of a plurality of holes 23a formed in members 23. Handles 100 as stated are pivoted on the pivot screws 104 and said handles are normally held in the position shown in Fig. 3 by a tensile coiled spring 109 secured at its ends to the handles 100 respectively by a headed screw 110. Screw 110 can be disposed in any one of a plurality of holes 100a formed in handles 100 and spaced longitudinally thereof. A hood 112 having a central portion of general semi-cylindrical form in cross section is provided and the same extends over a portion of bar 45 and upwardly therefrom to above pulley 82a. Hood 112 is secured to members 28 in any suitable manner, as by the bolt 29. At its lower end hood 112 is secured by screws 114 extending into the sides of speed reduction unit 54. Hood 112 has flat side portions 112a which extend outwardly and slightly downwardly therefrom and extend partly over wheels 10, as shown in Fig. 1. Another hood or shield 116 is provided, the same being of general semi-cylindrical form, the front end thereof being disposed beneath the upper rear end of shield 112 and the rear end thereof extending to substantially the end of members 25. Shield 116 is secured at its front end by the bolts 29 and is secured at its rear end in any suitable manner to members 25, as by the bolts 106.

In operation motor 60 will be operated. This will drive shaft 63 and counter-shaft 66 will be driven through belt 81. Pulley 82a will be driven from counter-shaft 66 which pulley will drive the belt 83 so that shaft 54a of the speed reduction unit 54 will be driven. It will be noticed that pulley 80 is of larger diameter than pulley 64 and that pulley 82 is of larger diameter than pulley 82a. There is thus quite a reduction of speed between shaft 63 and shaft 54a. A further reduction of speed takes places in the speed reducing unit 54 so that shaft 54d is driven at much lower speed than shaft 54a. Disc 52 is driven by shaft 54a and this results in a reciprocation of link 49 which also oscillates and in turn oscillates arm 45a so that the lower end of member 45 is oscillated. This through link 43 reciprocates member 40 so that sickle 34 is reciprocated at the desired speed. Reciprocation of sickle 34 and the teeth 34a thereof in cooperation with teeth 31c efficiently cuts the grass or other material to be mowed. The shaft 54d of unit 54 is also driven and through pulleys 89 and belts 90 the wheels 10 will be driven. The driving of wheels 10 will of course progress the mower along the ground. When the operator cranks or starts the motor 60 the crank member 74 can be moved to a position opposite to that shown in Fig. 5. The crank portion of member 74 is thus lowered, lowering the rear end of counter-shaft 66 and pulley 80. This results in slackening or loosening belt 81 so that counter-shaft 66 will not be driven. When the operator is ready to have the cutter or sickle 34 driven and the wheels 10 driven, he will move the crank 74 to its normal position, as shown in Fig. 5. This tightens belt 81 and the drive will now be made as above described. The operator grasps or holds the handles 100 and can guide the mower as desired. Owing to the mounting of the frame on the shaft 16, it will be seen that the frame can be swung horizontally about a vertical axis passing substantially through the axis of shaft 16 and said frame can also be swung about a horizontal axis substantially coincident with the axis of axle 11. The frame thus has universal movement about shaft 16 and about a point located substantially at the intersection of the axes of shaft 16 and axle 11. When the mower is being progressed the operator can manipulate the frame so that the sickle and sickle bar are maintained parallel to the ground where the cutting is being done, or, he may raise one end or the other to clear stones, stumps or other obstacles. The wheels 10 may rise or fall to follow the terrain so as to have constant, equalized traction effect. This is illustrated in Fig. 6 where line a—a represents the ground where the cut is being made, while the line b—b represents the slope of the ground over which the wheels are passing. By turning the frame about its point of movement by the handles 100, the operator can always dispose the sickle and sickle bar to follow uneven ground and avoid obstacles while cutting grass or other growth in rough places such as ditches along highways.

When the operator wishes to turn the machine, this can be accomplished by aid of the power of motor 60. When the operator swings one handle 100 inwardly, as shown in dotted lines for the right hand handle in Fig. 3, the bracket 99 is moved inwardly and forwardly. This through link 98 pushes forwardly on the upper end of the lever 93, which in turn pushes forwardly on link 92. Link 92 moves the respective end of axle 11 forwardly, the same oscillating about the center of shaft 16. When the end of axle 11 is thus moved forwardly, the respective belt 90 is slackened. This results in a reduction of the drive to the corresponding wheel 10. The wheel may be driven at slower speed or may not be driven at all. The other wheel 10 continues to be driven and this wheel continues to progress so that the mower is caused to turn. Instead of having to swing the mower entirely by hand the operator moves one or the other of the handles 100 inwardly somewhat and the machine tends to turn automatically. When one handle is thus swung inwardly the driven wheel greatly assists in making an abrupt turn, requiring little or no effort on the part of the operator. Swinging both handles inwardly will slacken both drive belts on the wheels and stop forward travel of machine and also allow the operator to pull the machine backwards away from a fence corner or other obstruction, and in extremely heavy cutting the handles may be pressed together to a point where the drive belts will slip enough to slow up the machine without slowing the speed of the sickle. The spring 109 normally holds the handles against the bars 105. The ends of the spring can be held by the bolts 110 in any one of the holes 100a. This gives some adjustment on the tension under which handles 100 are held. The bracket 99 can be moved on the handle bars 100 and this adjustment will be made to position the levers 93 and links 98 to give the desired tension on belts 90. When the frame oscillates about shaft 16, as described, the pulleys over which belts 90 run will be moved slightly out of alinement. This is illustrated in Fig. 6. This will not however interfere materially with the operation or drive of the belts 90. The tension of belts 81 and 83 can be nicely adjusted by adjustment of the nuts on the bolts 69 and 76. By removing the lower screws 114 securing the hood or shield 112, the same can be elevated, as shown in dotted lines in Fig. 2, to give access to said parts of the machine. By having two of the bosses 31b and bolts 32, the bar 31 is very rigidly held in place.

From the above description it will be seen that I have provided a very efficient and easily operated mower and one which will have a high degree of efficiency. The machine is also quite light in weight. The cutter is effectively driven from the motor on the machine and the wheels are also driven as desired so that the mower is progressed by power and the operator is relieved of the labor of pushing or propelling the same. The frame of the machine and the cutter can be moved about independently of the wheels so that the cutter can be very effectively disposed so as to get the best results. As described, the device acts to turn automatically and this turning can be controlled with great ease by the operator. The operator will soon become very skillful in controlling the turning of the device and in guiding the same. The belt 81 and its control by crank 74 constitutes in effect a clutch between the motor 60 and the counter-shaft 66. The driving of counter-shaft 66 does not take place until the operator has the motor in operation as desired. The fact that the motor 60 is disposed on the frame at the rear of axle 11, and the speed reduction unit 54 and parts carried thereby are disposed at the front of axle 11 and substantially the same distance therefrom as the motor 60 results in a nice balance of the machine forwardly or rearwardly or in its universal joint movement about the axis of axle 11. This balance adds greatly to the ease with which the machine can be manipulated. The mower has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combination of parts disclosed and defined in the appended claims.

What is claimed is:

1. A device of the class described having in combination, a pair of wheels, an axle on which said wheels are mounted, a frame mounted on said axle for oscillating movement in a vertical plane about an axis coincident with the axis of said axle, and for oscillating movement laterally about an axis disposed between the ends of said axle, a motor mounted on said frame in the rear of said axle, a reciprocating sickle carried on said frame at the front and extending transversely of said frame, means for reciprocating said sickle from said motor and handles at the rear end of said frame for manipulating said frame to dispose said sickle in different planes without changing the positions of said wheels.

2. A device of the class described having in combination, a pair of wheels, an axle on which said wheels are mounted, a frame mounted on said axle for oscillating movement relatively to said wheels in a horizontal plane about a substantial vertical axis disposed between the ends of said axle and for oscillating movement in a vertical plane about the axis of said axle, a motor mounted on said frame in the rear of said axle, a cutter carried on said frame at the front thereof and extending transversely of said frame, whereby said motor tends to counterbalance said cutter about the axis of said axle, means for operating said cutter from said motor and handles at the rear end of said frame for manipulating said frame to bring said cutter into different planes than the plane passing through the bottoms of said wheels.

3. A device of the class described having in combination, a pair of supporting wheels, means on which said wheels are mounted, a frame mounted on said means for movement in a horizontal plane and in vertical planes about a point on said means substantially midway between said wheels, a motor mounted on said frame, a cutter carried on said frame at the front thereof and extending transversely of said frame, means for operating said cutter from said motor, means for driving said wheels from said motor and handles at the rear of said frame for swinging said frame and cutter relatively to said wheels.

4. A mowing device having in combination, a pair of wheels, a member on which said wheels are mounted, a frame mounted on said member for movement in planes substantially at right angles to each other, a cutter at the front of said frame extending transversely thereof, a motor on said frame for operating said cutter and means at the rear of said frame adapted to be grasped by the operator for swinging said frame to bring said cutter into planes at an angle to a plane passing through the bottom of said wheels.

5. A mowing device having in combination, a pair of wheels, an axle on which said wheels are mounted, a frame mounted on said axle substantially at the center thereof and oscillatable in planes at right angles to each other about a point substantially in the axis of said axle, a cutter at the front of said frame and extending transversely thereof, handles projecting from the rear of said frame adapted to be held by the operator for swinging said frame and cutter, said frame being swingable in planes at right angles to each other whereby the operator can hold said cutter parallel with the ground while said wheels may rise or lower in accordance with the terrain independently of the position of said cutter.

6. A mowing device having in combination, a pair of wheels, a member on which said wheels are mounted, a frame mounted on said member substantially at the transverse center thereof for swinging movement in vertical and horizontal planes, a cutter at the front of said frame extending transversely thereof and handles at the rear of said frame and secured thereto constructed and arranged to be grasped by the operator, whereby said frame and cutter may be moved about vertical or horizontal axes relatively to said wheels.

7. A mowing device having in combination, a pair of wheels, an axle on which said wheels are mounted, a frame mounted on said axle for movement in a horizontal plane and in vertical planes about a point adjacent the center of said axle, a cutter at the front of said frame extending transversely thereof, a motor on said frame for driving said cutter, and handles at the rear of said frame adapted to be grasped by the operator for universally swinging said frame and cutter to said wheels.

8. A mowing device having in combination, a pair of wheels, an axle on which said wheels are mounted, a frame mounted on said axle for vertical and horizontal swinging movement relative to said wheels, a cutter extending transversely at the front of said frame, a motor for operating said cutter, a pair of means for respectively driving said wheels from said motor and means under the control of the operator for both swinging said frame and cutter and for rendering more or less inoperative one of said means whereby the wheel driven by the other of said means cause said device to turn.

9. A mowing device having in combination, a pair of wheels, means on which said wheels are mounted, a frame mounted on said means for swinging movement relatively to said wheels in planes at right angles to each other and about a point between said wheels, a cutter extending transversely at the front of said frame, a motor for operating said cutter, a pair of driving means for respectively driving said wheels from said motor, a pair of handles at the rear of said frame for swinging said frame and means carried by said handles connected to said driving means respectively for rendering more or less inoperative one of said driving means whereby the wheel driven by the other of said means will cause said device to turn.

10. A mowing device having in combination, a pair of wheels, an axle on which said wheels are mounted, a frame mounted on said axle for vertical and lateral swinging movement relative to said wheels, a cutter extending transversely at the front of said frame, a motor for operating said cutter, a pair of means for respectively driving said wheels from said motor, a pair of movable handles at the rear of said frame for swinging said frame and, means connected to said handles and operated by movement thereof connected to said first mentioned means respectively for rendering one of said means more or less inoperative, whereby the wheel driven by the other of said means will cause turning of said device.

11. A mowing device having in combination, a pair of wheels, an axle on which said wheels are mounted, a frame mounted on said axle for vertical and lateral swinging movement relative to said wheels, a cutter extending transversely at the front of said frame, a motor for operating said cutter, a pair of means for respectively driving said wheels from said motor, a pair of handles at the rear of said frame for swinging said frame and respectively pivoted for swinging movement, levers carried on said frame connected to said first mentioned means respectively and links connecting said handles and levers whereby the swinging of one of said handles will render more or less inoperative one of said means and the wheel driven by the other of said means will cause said device to turn.

12. A mowing device having in combination, a pair of supporting wheels, an axle on which said wheels are mounted, a frame carried by said axle, a cutter at the front of said frame extending transversely thereof, a motor on said frame at the rear of said axle, a counter-shaft carried on said frame above said motor extending longitudinally thereof, a motor shaft, a pulley on said motor shaft, a pulley on the rear end of said counter-shaft, a belt connecting said pulleys for driving said counter-shaft from said motor, a pulley adjacent the front end of said counter-shaft, means for driving said cutter from said counter-shaft including a belt running over said last mentioned pulley, a bearing for said counter-shaft adjacent said first mentioned pulley and means for raising and lowering said bearing for varying the position of said counter-shaft for placing the desired tension on said belts.

13. A mowing device having in combination, a pair of wheels, an axle on which said wheels are mounted, a frame mounted on said axle, a cutter extending transversely at the front of said frame, a motor for operating said cutter, a pair of means for respectively driving said wheels from said motor, a pair of laterally swingable handles for manipulating said device, a single resilient means for holding said handles in normal position and means operated by swinging movement of a handle for rendering more or less inoperative one of said means driving one of said wheels.

14. A mowing device having in combination, a pair of wheels, an axle on which said wheels are mounted, a frame swingably mounted on said axle, a cutter extending transversely at the front of said frame, a motor for operating said cutter, a pair of means for respectively driving said wheels from said motor, including a belt for each wheel, a pair of spaced handles extending rearwardly from said frame for swinging said frame and cutter, said handles being pivoted for lateral swinging movement, stop means engaged by said handles, a single spring for holding said handles in normal position engaging said stop means, and means operated by said handles when swung laterally for slackening said belts respectively whereby the drive to one or both of said wheels may be discontinued.

AXEL M. WALSTROM.

REFERENCES CITED

The following references are of record in the file of this patent:

UNITED STATES PATENTS

| Number    | Name          | Date          |
|-----------|---------------|---------------|
| 1,458,963 | Aultman       | June 19, 1923 |
| 2,082,600 | Squires et al.| June 1, 1937  |
| 2,160,259 | Cooper        | May 30, 1939  |
| 2,219,494 | Rieger        | Oct. 29, 1940 |
| 2,236,598 | Hautzenroeder | Apr. 1, 1941  |
| 2,263,886 | Munro         | Nov. 25, 1941 |
| 2,292,580 | Moyer et al.  | Aug. 11, 1942 |
| 2,328,803 | Hayes         | Sept. 7, 1943 |
| 2,359,642 | Hayes         | Oct. 3, 1944  |